(12) United States Patent
Sperber et al.

(10) Patent No.: US 11,719,239 B2
(45) Date of Patent: Aug. 8, 2023

(54) PUMP UNIT FOR CLUTCH ACTUATION

(71) Applicant: FTE AUTOMOTIVE GmbH, Ebern (DE)

(72) Inventors: Christian Sperber, Ebern (DE); Wilhelm Heubner, Ebern (DE); Patrick Gegner, Ebern (DE); Alexander Lehnert, Ebern (DE); Frank Sauerteig, Ebern (DE); Benjamin Wuechner, Ebern (DE)

(73) Assignee: FTE AUTOMOTIVE GmbH, Ebern (DE)

( * ) Notice: Subject to any disclaimer, the term of this patent is extended or adjusted under 35 U.S.C. 154(b) by 0 days.

(21) Appl. No.: 17/480,742

(22) Filed: Sep. 21, 2021

(65) Prior Publication Data
US 2022/0112906 A1 Apr. 14, 2022

(30) Foreign Application Priority Data
Oct. 14, 2020 (DE) ...................... 10 2020 127 070.4

(51) Int. Cl.
*F04C 2/344* (2006.01)
*F16H 61/00* (2006.01)
(Continued)

(52) U.S. Cl.
CPC .............. *F04C 2/344* (2013.01); *F15B 11/17* (2013.01); *F16H 57/0435* (2013.01);
(Continued)

(58) Field of Classification Search
CPC ........ F04C 2/344; F04C 2/3442; F15B 11/17; F16H 57/0435; F16H 57/0441; F16H 61/0031
See application file for complete search history.

(56) References Cited

U.S. PATENT DOCUMENTS 5,141,418 A * 8/1992 Ohtaki ................. F04C 14/226
418/268
2004/0035102 A1 2/2004 Roth et al.
(Continued)

FOREIGN PATENT DOCUMENTS

DE 196 52 831 A1 6/1998
DE 102 19 786 A1 11/2003
(Continued)

OTHER PUBLICATIONS

English language translation of DE-10327406-A1 (Year: 2005).*
(Continued)

*Primary Examiner* — Kenneth Bomberg
*Assistant Examiner* — Matthew Wiblin
(74) *Attorney, Agent, or Firm* — Oblon, McClelland, Maier & Neustadt, L.L.P.

(57) ABSTRACT

A pump unit for clutch actuation, having a high-pressure port for clutch actuation, a low-pressure port for a lubricant flow, a single drive motor and a dual pump, which is driven by the drive motor and has a high-pressure outlet, which is connected to the high-pressure port with a high-pressure line, and a low-pressure outlet, which is connected to the low-pressure port with a low-pressure line, wherein a pre-filling line which leads from the low-pressure line to the high-pressure line is provided.

8 Claims, 6 Drawing Sheets

(51) Int. Cl.
*F15B 11/17* (2006.01)
*F16H 57/04* (2010.01)

(52) U.S. Cl.
CPC ..... *F16H 57/0441* (2013.01); *F16H 61/0025* (2013.01); *F16H 61/0031* (2013.01)

(56) References Cited

U.S. PATENT DOCUMENTS

| | | |
|---|---|---|
| 2008/0277239 A1 | 11/2008 | Gassmann et al. |
| 2011/0173965 A1 | 7/2011 | Holmes et al. |
| 2012/0275945 A1 | 11/2012 | Schulz-Andres et al. |
| 2014/0334955 A1* | 11/2014 | Kim .................. F04B 39/02 |
| | | 417/447 |
| 2019/0003587 A1 | 1/2019 | Schafer et al. |
| 2019/0093677 A1* | 3/2019 | Ohgata .................. F15B 11/17 |

FOREIGN PATENT DOCUMENTS

| | | | |
|---|---|---|---|
| DE | 10327406 A1 * | 2/2005 | ......... F16H 61/0031 |
| DE | 10 2007 026 141 A1 | 12/2008 | |
| WO | WO 2011/042105 A2 | 4/2011 | |

OTHER PUBLICATIONS

German Search Report dated Jul. 15, 2021 in DE 10 2020 127 070.4, filed on Oct. 14, 2020 (with English Translation of Categories of Cited Documents), 6 pages.

Extended European Search Report dated Mar. 7, 2022 in European Patent Application No. 21200597.9, 9 pages.

\* cited by examiner

PUMP UNIT FOR CLUTCH ACTUATION

The invention relates to a pump unit for clutch actuation.

In motor vehicle drivetrains, it is possible for various clutches, which are hydraulically actuated, to be present. Examples are friction clutches, as are used in transmissions which can be shifted in an automated manner, dual clutches, which make it possible for a switch to be made from a first gearwheel set to a second gearwheel set without interrupting the transmission of torque in a dual-clutch transmission, clutches for coupling and decoupling an electric motor, etc.

A whole series of requirements are made on a pump unit for actuating such a clutch. Firstly, a fluid flow at a high pressure should be provided, in order that the clutch can be reliably closed or opened. At the same time, the clutch should be actuated as quickly as possible. In the case of some transmissions, it is moreover desired to provide hydraulic fluid to lubricate the transmission and cool the clutch. Finally, the pump unit should use as little energy as possible.

The object of the invention is to provide a pump unit which meets these requirements.

In order to solve this problem, provided according to the invention is a pump unit for clutch actuation, having a high-pressure port for clutch actuation, a low-pressure port for a lubricant flow, a single drive motor and a dual pump, which is driven by the drive motor and has a high-pressure outlet, which is connected to the high-pressure port by means of a high-pressure line, and a low-pressure outlet, which is connected to the low-pressure port by means of a low-pressure line, wherein a prefilling line which leads from the low-pressure line to the high-pressure line is provided. This pump unit makes it possible to provide, with a single pump, a high pressure that is desired for actuation of the pump and also a lubricant flow at low pressure. By virtue of the prefilling line, it is possible to "divert" some of the lubricant flow, with the result that it can be used to prefill an actuator of the clutch. As soon as this prefilling line is prefilled to a sufficient extent, the further control of the clutch actuator is effected only by means of the high-pressure flow.

The term "dual pump" refers here to a hydraulic pump which has both a low-pressure outlet and a high-pressure outlet. This is a question not of the interconnection of two different pumps, but of one unit comprising a single drive motor. During operation, the dual pump delivers a hydraulic fluid flow at the low-pressure outlet with low pressure but a high volumetric flow rate, while at the high-pressure outlet a hydraulic fluid flow is provided which has a low volumetric flow rate but high pressure. The ratio of the volumetric flow rates may be 1:10, for example.

According to one embodiment of the invention, it is provided that a check valve, which blocks flow in a flow direction from the high-pressure line to the low-pressure line, is arranged in the prefilling line. The check valve makes it possible, during operation of the dual pump, to supply the high-pressure port of the pump unit with hydraulic fluid also from the low-pressure side of the pump as long as the pressure there is lower than the pressure of the hydraulic fluid at the low-pressure outlet of the dual pump. In this way, a clutch actuator can be prefilled very quickly. As soon as the pressure at the high-pressure port corresponds to the pressure provided by the dual pump at the low-pressure outlet, fluid can no longer flow through the check valve, and the further increase in pressure at the high-pressure port is provided by the high-pressure outlet of the dual pump alone. In this respect, the check valve prevents the high-pressure fluid provided from escaping to the low-pressure side. A bypass line, in which a throttle or diaphragm is arranged, may be assigned to the check valve. The bypass line makes it possible to increase the return speed for the purpose of emptying the clutch actuator.

According to one embodiment of the invention, a throttle or diaphragm is provided in the low-pressure line downstream of the branch of the prefilling line. This ensures a certain back pressure, with the result that a sufficient volumetric flow is "diverted" from the low-pressure side of the pump unit to the high-pressure side for the purpose of prefilling.

In the low-pressure line, a control valve may also be provided downstream of the branch of the prefilling line. The control valve makes it possible to build up hydraulic fluid actively, in order that the high-pressure side of the pump unit is prefilled with the volumetric flow from the low-pressure side. When the prefilling has concluded or if it is not necessary, the control valve can be completely opened, so that a pressure drop is not created.

A control valve may be provided in the prefilling line, in order to be able to actively control the flow cross section of the prefilling line as an alternative or in addition to the passive check valve.

According to one configuration of the invention, a pressure-controlled switching valve, which makes it possible to connect the high-pressure line directly to a reservoir, is provided in the high-pressure line. This switching valve makes it possible to increase the speed at which hydraulic fluid can be discharged from the high-pressure side, such that the clutch is opened more quickly.

According to one configuration, a pressure-controlled switching valve, which makes it possible to switch between a throttled throughflow and a free throughflow, is provided in the low-pressure line downstream of the branch of the prefilling line. This makes it possible to suitably build up the hydraulic fluid on the low-pressure side as required, with the result that it is diverted to the high-pressure side, while during operating phases in which this is not required the hydraulic fluid on the low-pressure side can flow away unimpeded to the lubricant port.

According to one embodiment of the invention, it is provided that the drive motor can be driven in two directions of rotation. This makes it possible to draw fluid into the high-pressure port of the pump unit, with the result that a clutch actuator connected to the high-pressure port can be emptied very quickly. Accordingly, the clutch can be opened very quickly.

According to one embodiment of the invention, the dual pump is a rotary vane pump, in which in each case one low-pressure chamber is delimited between adjacent rotary vanes and in each case one high-pressure chamber is delimited between a rotor and the face side of the rotary vane received in the rotor. This design is distinguished by a particularly compact configuration. As an alternative to a rotary vane pump, it is also possible to use a pump in which two rotors are arranged next to one another on a common drive shaft, wherein the rotors are designed differently in terms of the conveyed volume and the delivery pressure. For example, two toothed-gear pumps (also referred to as gerotor pumps) or two external-gearwheel pumps may be arranged next to one another.

The invention will be described below on the basis of various embodiments which are illustrated in the appended drawings, in which:

FIG. 1 schematically shows a pump unit according to a first embodiment;

Figure 7:
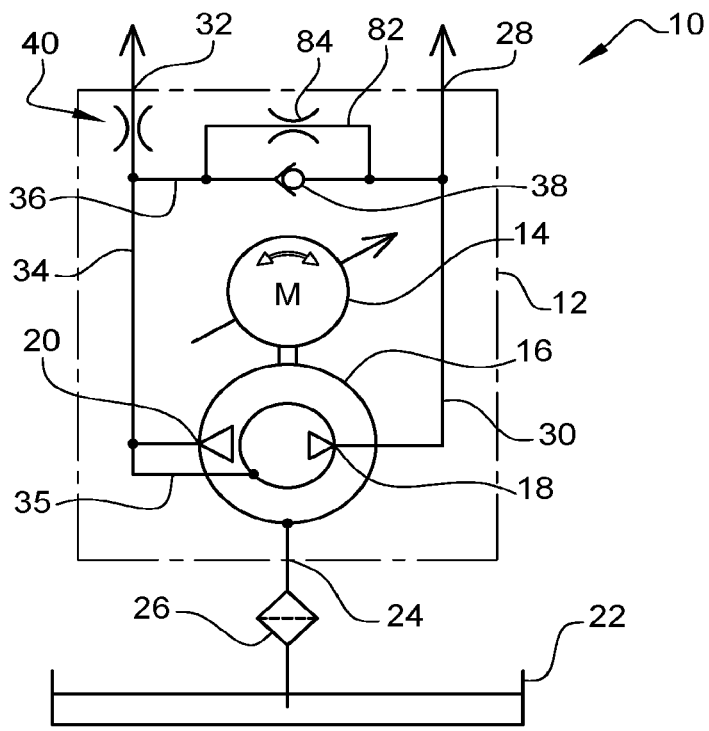
Figure 8:
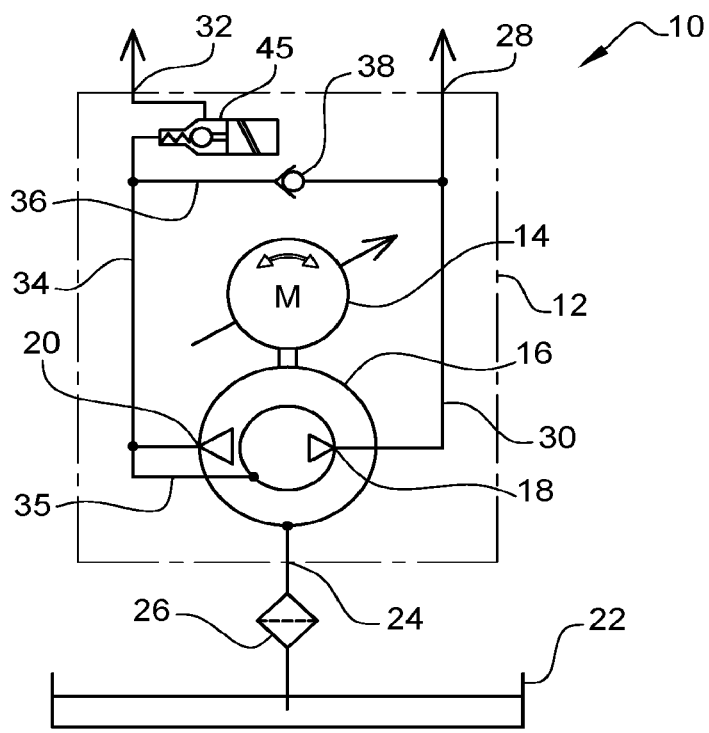
Figure 9:
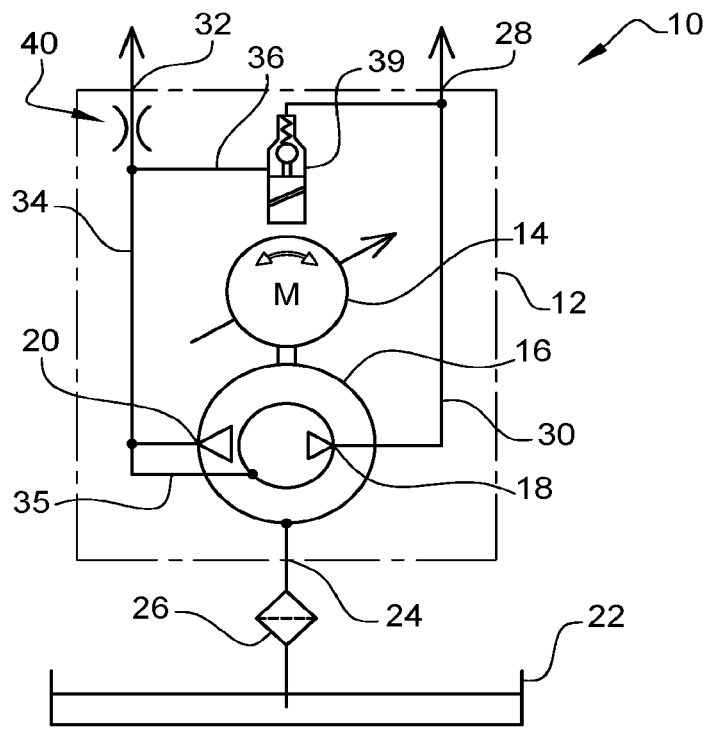
Figure 10:
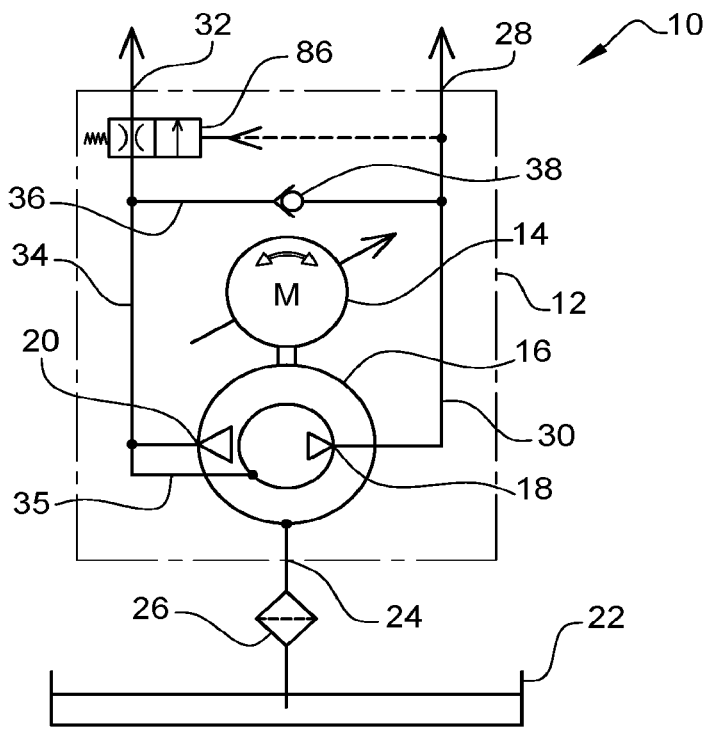

FIG. 7 schematically shows a pump unit according to a second embodiment;

FIG. 8 schematically shows a pump unit according to a third embodiment;

FIG. 9 schematically shows a pump unit according to a fourth embodiment;

FIG. 10 schematically shows a pump unit according to a fifth embodiment; and

Figure 1:
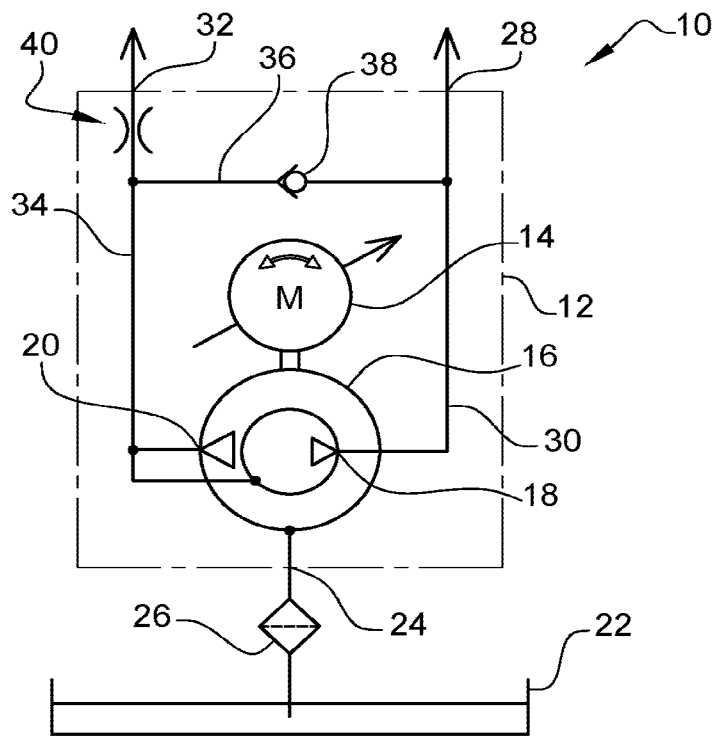
Figure 11:
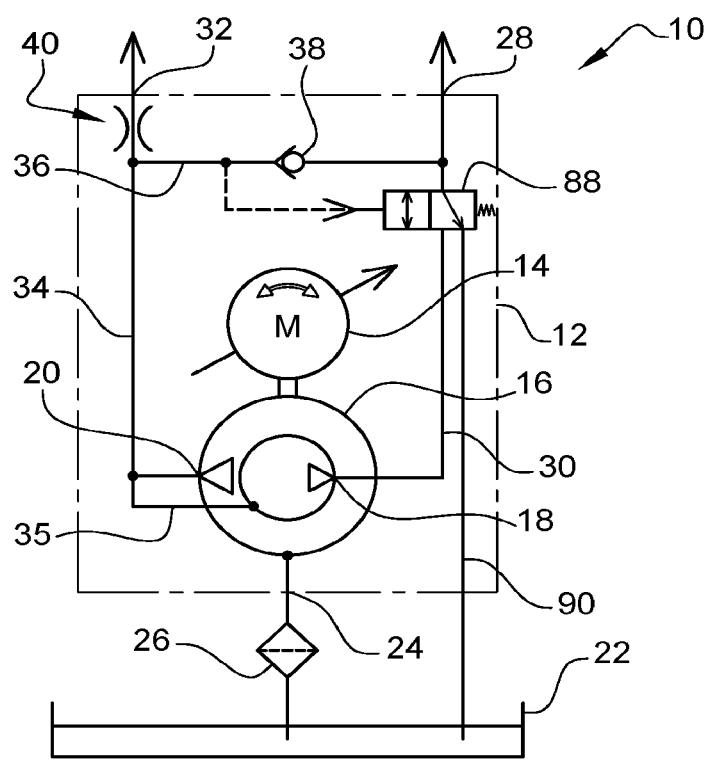

FIG. 11 schematically shows a pump unit according to a sixth embodiment;

FIG. 1 schematically shows a pump unit 10 which comprises a housing 12 and, received therein, a drive motor 14 and a dual pump 16.

The housing 12 may be a dedicated housing or part of a superordinate assembly, for example a transmission housing, which is part of a drivetrain of a motor vehicle.

The drive motor 14 is preferably an electric motor, which can be driven in both directions of rotation. A control means (not shown here), which also makes it possible to control the rotational speed of the drive motor 14 in an open-loop or closed-loop manner, is provided.

The dual pump 16 is a hydraulic-oil pump, by means of which a hydraulic fluid can be conveyed. The specific characteristic feature of the dual pump 16 is that it has a high-pressure outlet 18 and a low-pressure outlet 20.

At the high-pressure outlet 18 the hydraulic fluid is provided with high pressure but a low volumetric flow rate, while at the low-pressure outlet 20 the hydraulic fluid is provided with a large volumetric flow rate but low pressure. The volumetric flow rate at the low-pressure outlet 20 may be greater than it is at the high-pressure outlet 18 by a factor of 10, for example.

The pump unit 10 draws fluid in from a reservoir 22, wherein a filter 26 is provided between a suction port 24 of the pump unit 10 and the reservoir 22.

The reservoir 22 may be an external reservoir, or may be integrated in the housing 12. It may also be the case that the reservoir 22 is formed within a transmission housing if the pump unit 10 is attached directly to a transmission housing.

The pump unit 10 has a high-pressure port 28, which is connected to the high-pressure outlet 18 of the dual pump 16 by way of a high-pressure line 30. A clutch actuator can be supplied with highly pressurized hydraulic fluid via the high-pressure port 28, for example, in order for example to switch a clutch.

The pump unit 10 also has a low-pressure port 32, which is connected to the low-pressure outlet 20 of the dual pump 16 by way of a low-pressure line 34. A hydraulic fluid flow, which is used to lubricate or cool a clutch or the transmission, may be provided by way of the low-pressure port 32.

A prefilling line 36, which connects the low-pressure line 34 to the high-pressure line 30, is provided.

A check valve 38, which opens in a flow direction from the low-pressure side to the high-pressure side and blocks flow in the opposite direction, is arranged in the prefilling line 36.

A diaphragm or throttle 40, which uses a certain flow resistance to counteract a fluid flow towards the low-pressure port 32, is arranged downstream of the branch of the prefilling line 36 from the low-pressure line 34.

Figure 2:
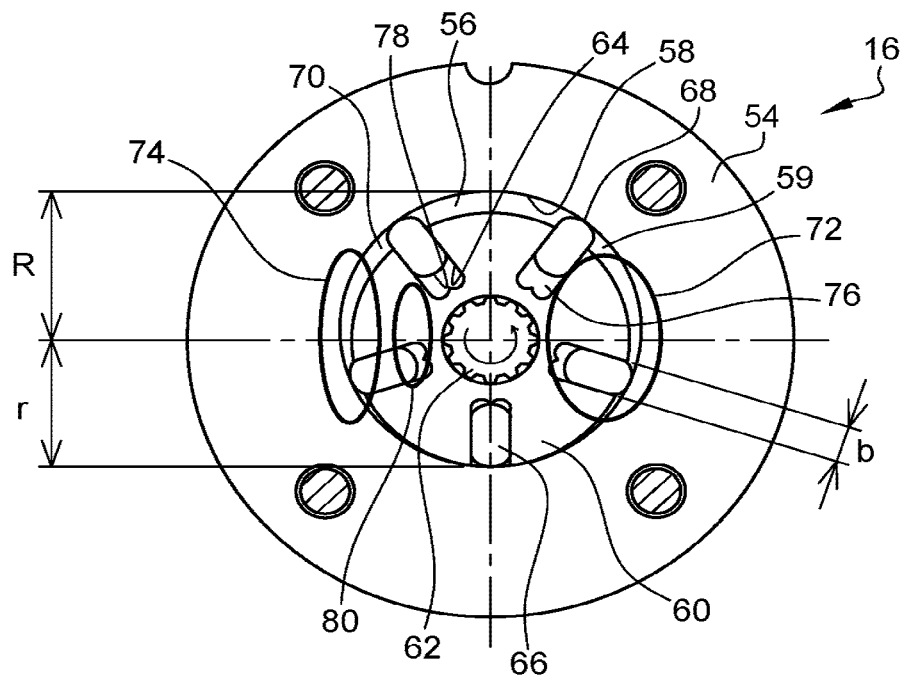
FIG. 2 shows a schematic section of one configuration of a dual pump, which can be used in the pump unit of FIG. 1.

FIG. 2 shows an exemplary embodiment of a dual pump 16. Here, this is a rotary vane pump with a stator 54 in which there is formed an interior space 56 which is surrounded by an inner wall 58.

A rotor 60 is arranged in the interior of the stator 54 and is mounted on a shaft 62 and can be driven by the latter.

The rotor 60 is provided with multiple receptacles 64, in which in each case one rotary vane 66 is received.

The receptacles 64 extend in the axial direction normally from a face side of the rotor 60 as far as the opposite face side, and from the outer periphery of the rotor inwards. In the exemplary embodiment shown, the receptacles 64 extend in the radial direction. This is not necessary, however.

Here, the rotary vanes are in the form of plates whose dimension in the radial direction is slightly less than the radial depth of the receptacles 64. Each of the plates has a thickness b, which corresponds to the width of the receptacles 64.

As an alternative to plate-like rotary vanes, use may also be made of rotary vanes which are in the form of a cylinder.

The rotor 60 has a diameter of 2×r (minus a clearance between rotor and stator that is to be provided in the design), which is less than the diameter r+R of the interior space 56 of the stator 54. The rotor 60 is arranged eccentrically in the interior space, specifically such that it is (almost) in contact with the inner wall 8 on one side (at the 6 o'clock position in this case). Accordingly, the maximum spacing to the outer wall of the rotor 60 is on the diametrically opposite side.

The rotary vanes 66 bear with their radially outer side 68 permanently against the inner wall 58 of the stator 54 (at any rate when the rotor 60 is rotating). Consequently, between rotary vanes 66 adjacent to one another in the peripheral direction, the inner wall 58 of the stator 54, the outer wall of the rotor 60 and two side walls which close off the interior space 56 at the face sides of the rotor 60 (and of which only the "rear" side wall 59 can be seen here), in each case one low-pressure chamber 70 is delimited.

In the exemplary embodiment shown, there are, since five rotary vanes 66 are present, also five low-pressure chambers 70 formed. The volume of each individual low-pressure chamber, for one rotation of the rotor 60 through 360°, changes from a minimum value (when the low-pressure chamber 70 is approximately at the 6 o'clock position) via a maximum value (when the low-pressure chamber 70 is approximately at the 12 o'clock position) and back to the minimum value.

Hydraulic fluid is fed to the low-pressure chambers 70 through the inlet 72. Said inlet, as seen in the direction of rotation of the rotor 60, is situated behind the point at which the spacing between the outer surface of the rotor 60 and the inner wall 58 of the stator 54 is minimal.

The hydraulic fluid drawn in by the low-pressure chambers 70 via the inlet 72 is delivered via a low-pressure outlet 74, which, as seen in the peripheral direction, is behind the position at which the low-pressure chambers 70 have the maximum volume, but in front of the position at which the spacing between the outer side of the rotor 60 and the inner wall 58 of the stator 54 is minimal.

The inlet 72 and the low-pressure outlet 74 are arranged here in one of the side walls 59 of the hydraulic pump 16 or else, so as to improve the filling, in both side walls 59, so that the hydraulic fluid can be drawn into the low-pressure chamber 70, and pushed out therefrom, from both sides.

Each of the rotary vanes 66 delimits together with the rotor 60 (and also the side walls 59) in each case one high-pressure chamber 76. Specifically, each radially inner side 78 of each rotary vane 66 delimits, together with the walls of the receptacle 64 and the side walls 59 shown, in each case one high-pressure chamber 76.

The volume of the high-pressure chambers 76 changes according to the displacement of the rotary vanes 66 in the receptacles 64. When the rotary vanes 66 move outwards (that is to say during a movement from the 6 o'clock position to the 12 o'clock position via the 3 o'clock position in the exemplary embodiment shown), the volume of the high-pressure chambers 76 increases, and when the rotary vanes 66 move inwards (that is to say during a movement from the 12 o'clock position to the 6 o'clock position via the 9 o'clock position), the volume decreases.

In this way, there is formed a piston pump in which the radially inner side 78 of each rotary vane 66 may be regarded as the face surface of a pump piston which is adjusted by means of a curved path (of the inner wall 58 of the stator 54). For drawing-in, the pump piston is adjusted outwards under the action of centrifugal force, and for pushing-out, the pump piston is displaced inwards owing to the contour of the inner wall 58 of the stator 54.

The high-pressure chamber 76 draws in via the same inlet 72 as that which provides a supply to the low-pressure chambers 70.

A high-pressure outlet 80 which is separate from the low-pressure outlet 74 is provided on the pressure side of the high-pressure pump. In the peripheral direction, said high-pressure outlet is arranged approximately at the same position as the low-pressure outlet 74.

The high-pressure outlet 80 may be provided either at only one of the side walls 59 of the stator 54 (and thus also of the rotor 60) or at both face sides.

As an alternative to the rotary vane pump shown in FIG. 2, it is also possible to use other pump types which are capable of providing two different hydraulic flows with a single drive motor 14.

Various operating states of the pump unit 10 shown in FIG. 1 will be explained below on the basis of FIGS. 3-6.

Figure 3:
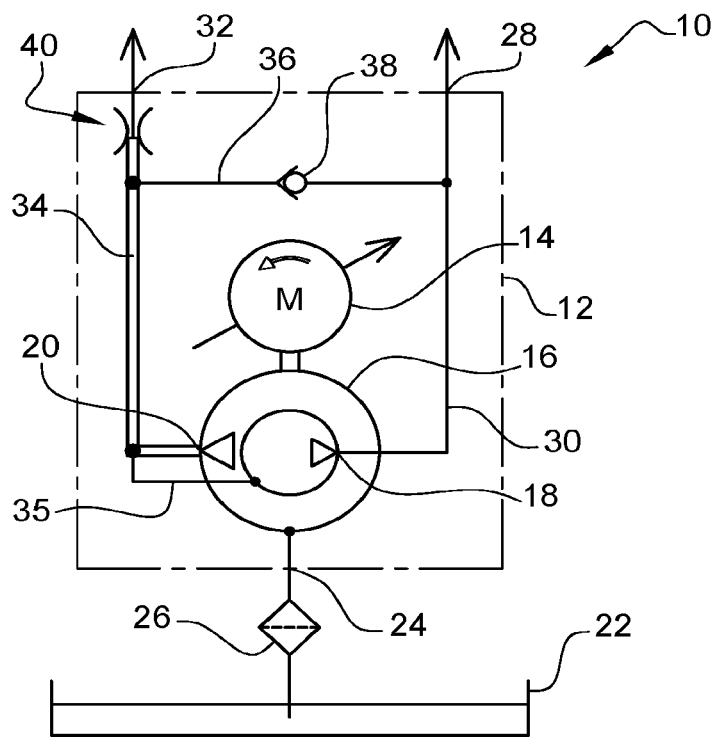
FIG. 3 shows the pump unit of FIG. 1 in a first operating state.

FIG. 3 shows the pump unit 10 in a state in which there is a requirement to close a clutch connected to the high-pressure port 28. In order that the clutch can be closed quickly, it is desirable to fill the clutch actuator quickly with hydraulic fluid and to bring the clutch to the "kiss point", that is to say the point at which transmission of torque begins.

The pump draws in hydraulic fluid via the suction port 24. The hydraulic fluid is conveyed to the high-pressure port 28 via the high-pressure outlet 18 and the high-pressure line 30. At the same time, hydraulic fluid is conveyed into the low-pressure line 34 via the low-pressure outlet 20. Some of the hydraulic fluid flows through the low-pressure port 32. On account of the diaphragm 40, however, a certain back pressure is obtained in the low-pressure line 34, with the result that some of the low-pressure hydraulic oil flow flows to the high-pressure line 30 via the prefilling line 36 and the opening check valve 38 and arrives at the clutch actuator via the high-pressure port 28. Said clutch actuator is thus filled by an overall volumetric flow which consists of a high-pressure volumetric flow and some of the low-pressure volumetric flow.

Figure 4:
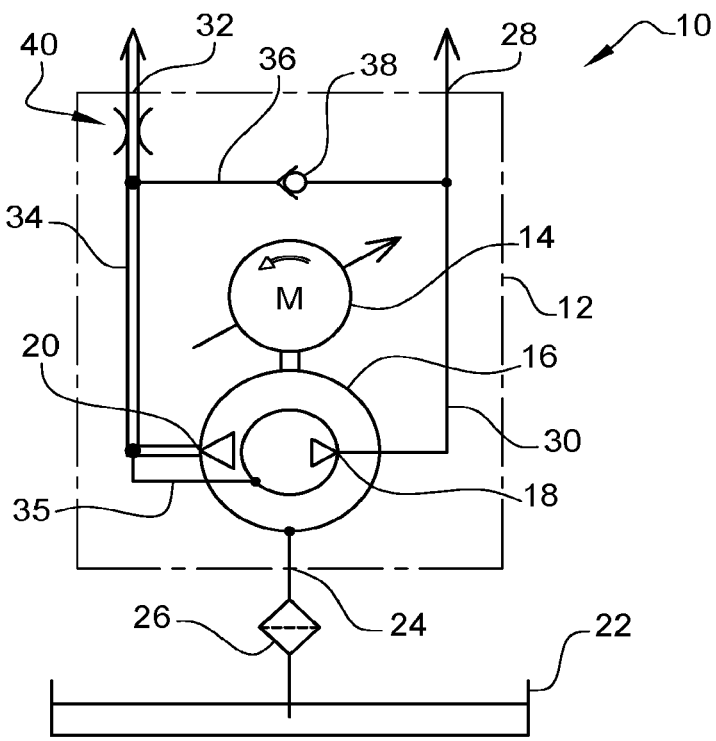
FIG. 4 shows the pump unit of FIG. 1 in a second operating state.
Figure 5:
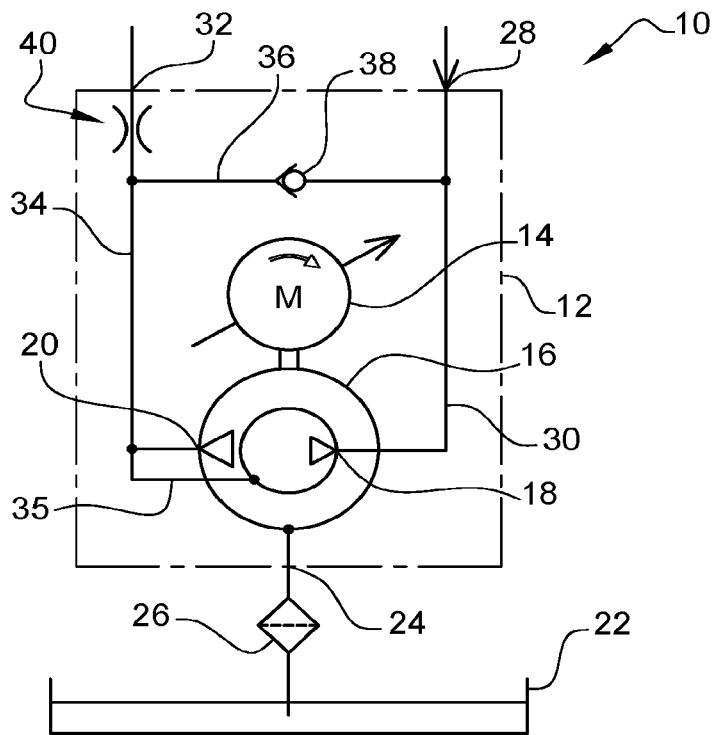
FIG. 5 shows the pump unit of FIG. 1 in a third operating state.

As soon as a pressure corresponding to the back pressure in the low-pressure line 34 is reached on the high-pressure side, a volume can no longer be conveyed to the high-pressure side via the prefilling line 36. The check valve 38 then closes, and the pump unit 10 is in its normal operating state, as shown in FIG. 4. In this operating state, the high-pressure port 28 is supplied with hydraulic fluid from the high-pressure outlet 18 of the dual pump 16, and the further closing of the clutch is controlled in an open-loop or closed loop manner via a control valve (not shown here).

In the normal operating state, provided at the low-pressure port 32 of the pump unit 10 is a lubricant flow or coolant flow, by means of which the clutch can be cooled or else bearing points of the transmission can be lubricated.

In the normal operating state, the rotational speed of the drive motor 14 is a rated rotational speed, while for prefilling purposes the rotational speed of the drive motor can be temporarily increased, for example to 1.5 times the rated rotational speed. For prefilling purposes, it is sufficient to maintain the increased rotational speed for a very short time, for example 400 ms.

When the clutch should be reopened, the rotational speed of the drive motor 14 can be reduced even further. It is also possible to temporarily drive the drive motor 14 in the opposite direction of rotation (see FIG. 5), with the result that the hydraulic fluid is drawn in at the high-pressure port 28. Accordingly, the clutch actuator is actively emptied. This makes it possible to realize shorter actuation times when opening the clutch.

Figure 6:
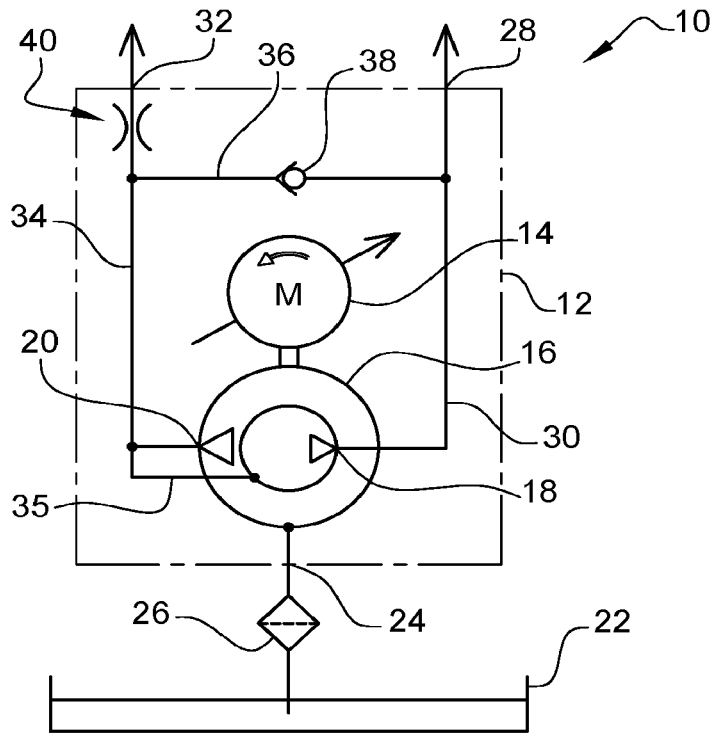
FIG. 6 shows the pump unit of FIG. 1 in a fourth operating state.

FIG. 6 shows an operating state of the pump unit in which no high-pressure fluid for actuating the clutch, but merely a coolant flow or lubricant flow, is provided. The rotational speed of the drive motor 14 is lowered far enough here that the hydraulic oil pressure provided at the high-pressure port 28 is not sufficient to close the clutch.

Visible in the figures is a branch 35, by means of which hydraulic fluid can be conducted from the low-pressure side into the high-pressure chambers 76. This supports the drawing of hydraulic fluid into the high-pressure chambers 76 and ensures that the rotary vanes 66 reliably bear against the inner wall 58.

FIG. 7 shows a second embodiment of the invention. The same reference signs are used for the components known from the first embodiment, and, in this respect, reference is made to the explanations above.

The difference between the first and the second embodiment is that provided in the second embodiment is a bypass line 82, in which a diaphragm or throttle 84 is arranged.

The bypass line 82 increases the return speed at which the clutch actuator can be emptied if the clutch should be opened.

As an alternative to the bypass line 82, the dual pump 16 can also be designed with higher internal leakage, for example by way of an increased axial clearance, with the result that the clutch actuator can be emptied through the dual pump 16 when the pump is at a standstill.

FIG. 8 shows a third embodiment of the invention. The same reference signs are used for the components known from the preceding embodiments, and, in this respect, reference is made to the explanations above.

The difference between the third and the first embodiment is that in the third embodiment a control valve 45, by means of which the back pressure in the high-pressure line 30 can be controlled in the desired manner, is provided instead of the throttle or diaphragm 40. When the intention is for hydraulic fluid to flow from the low-pressure side to the high-pressure side via the prefilling line 36, the control valve 45 is closed, and therefore the high-pressure line 30 and the clutch actuator connected to the high-pressure port 28 can be prefilled to a maximum extent by the pressure of the low-pressure outlet 20 of the dual pump 16. After this, the control valve 45 is opened, so that the coolant flow and lubricant flow can be provided via the low-pressure port 32 without a pressure drop.

FIG. 9 shows a fourth embodiment of the invention. The same reference signs are used for the components known from the preceding embodiments, and, in this respect, reference is made to the explanations above.

The difference between the fourth and the first embodiment is that in the fourth embodiment a control valve 39, which can actively represent the mode of operation of the passive check valve 38, is provided instead of the check valve 38. Therefore, when the intention is for hydraulic fluid to flow from the low-pressure side to the high-pressure side via the prefilling line 36, the control valve 39 is opened, and when the intention is for the clutch actuator to be closed in a controlled manner by the hydraulic fluid provided from the high-pressure outlet 18, the control valve 39 is closed. In order to quickly dissipate pressure on the high-pressure side, the valve can be reopened, and the volume can escape to the low-pressure side.

FIG. 10 shows a fifth embodiment of the invention. The same reference signs are used for the components known from the preceding embodiments, and, in this respect, reference is made to the explanations above.

The difference between the fifth and the first embodiment is that provided in the fifth embodiment is a pressure-controlled switchover valve 86, which can make a switch between a state with throttled throughflow and a state with free throughflow. This makes it possible to implement the function of the throttle or diaphragm 40 for the purpose of prefilling the clutch actuator, while a free throughflow is possible whenever fluid is not intended to be diverted from the low-pressure side to the high-pressure side.

FIG. 11 shows a sixth embodiment of the invention. The same reference signs are used for the components known from the preceding embodiments, and, in this respect, reference is made to the explanations above.

The difference between the sixth and the first embodiment is that in the sixth embodiment there is provided in the high-pressure line 30 a pressure-controlled switching valve 88, which can be switched between a state in which the high-pressure outlet 18 is connected to the high-pressure port 28 and an emptying state, in which the high-pressure port 28 is connected to an emptying line 90, which leads to the reservoir 22. In this way, the clutch actuator can be emptied particularly quickly.

It is fundamentally possible to combine the various features of the different embodiments with one another. For example, the bypass line 82 of FIG. 7 can also be used in the embodiments of FIGS. 8, 10 and 11. The control valve of FIG. 8 can be used in the embodiment of FIGS. 7, 9 and 11. The control valve of FIG. 9 can be used in the embodiment of FIGS. 8, 10 and 11. The control valve of FIG. 10 can be used in the embodiment of FIGS. 7, 9 and 11. Finally, the switching valve of FIG. 11 can be used in the embodiment of FIGS. 8, 9 and 10.

The invention claimed is:

1. A pump unit for clutch actuation, having a high-pressure port for clutch actuation, a low-pressure port for a lubricant flow, a single drive motor and a dual pump, which is driven by the drive motor and has a high-pressure outlet, which is connected to the high-pressure port with a high-pressure line, and a low-pressure outlet, which is connected to the low-pressure port with a low-pressure line, wherein a prefilling line which leads from the low-pressure line to the high-pressure line is provided,
   wherein a check valve which blocks flow in a flow direction from the high-pressure line to the low-pressure line is provided in the prefilling line,
   wherein the drive motor is an electric motor which can be driven in two directions of rotation and a control means controls the rotational speed of the drive motor, and in a normal operating state when the check valve is closed, the rotational speed of the drive motor is a rated rotational speed, while for prefilling purposes when the check valve is open, the rotational speed of the drive motor is temporarily increased.

2. The pump unit according to claim 1, wherein a bypass line for the check valve is provided, wherein a throttle or diaphragm is arranged in the bypass line.

3. The pump unit according to claim 1, wherein a throttle or diaphragm is provided downstream of a juncture with the prefilling line in the low-pressure line.

4. The pump unit according to claim 1, wherein a control valve is provided in the low-pressure line downstream of a juncture with the prefilling line.

5. The pump unit according to claim 1, wherein a control valve is provided in the prefilling line.

6. The pump unit according to claim 1, wherein a pressure-controlled switching valve, which makes it possible to connect the high-pressure line directly to a reservoir, is provided in the high-pressure line.

7. The pump unit according to claim 1, wherein a pressure-controlled switching valve, which makes it possible to switch between a throttled throughflow and a free throughflow, is provided in the low-pressure line downstream of a juncture with the prefilling line.

8. The pump unit according to claim 1, wherein the dual pump is a rotary vane pump,
   wherein one low-pressure chamber is delimited between each pair of adjacent rotary vanes and one high-pressure chamber is delimited between a rotor and a face side of each of the rotary vanes received in the rotor.

* * * * *